United States Patent [19]

McNeight et al.

[11] Patent Number: 4,586,707

[45] Date of Patent: May 6, 1986

[54] COMPETITIVE GAME

[76] Inventors: David L. McNeight, Regent House, Heaton Lane, Stockport, Cheshire; John G. Lawrence, The Barn, Hollies Lane, Wilmslow, Cheshire; Pauline Chorlton, 8 Oak Avenue, Newtown, New Mills, Stockport, Cheshire, all of England

[21] Appl. No.: 728,148

[22] Filed: Apr. 29, 1985

Related U.S. Application Data

[63] Continuation of Ser. No. 427,726, Sep. 29, 1982, abandoned.

[30] Foreign Application Priority Data

Jan. 2, 1982 [GB] United Kingdom ................ 8200013

[51] Int. Cl.$^4$ ................................................ A63F 9/00
[52] U.S. Cl. .................................... 273/1 R; 273/139
[58] Field of Search ................ 273/1 R, 139; 283/17; 434/119, 352

[56] References Cited

U.S. PATENT DOCUMENTS

| | | | |
|---|---|---|---|
| 2,562,179 | 7/1951 | Dorf | 434/352 |
| 2,654,163 | 10/1953 | Reynolds | 434/352 |
| 3,556,530 | 1/1971 | Barr | 273/139 |
| 3,577,656 | 5/1971 | Lynn et al. | |
| 3,718,349 | 2/1973 | Small | 434/119 X |
| 3,815,919 | 6/1974 | Cain et al. | |
| 3,998,465 | 12/1976 | Mascola | 273/139 |

FOREIGN PATENT DOCUMENTS

| | | | |
|---|---|---|---|
| 1072970 | 5/1966 | United Kingdom | 273/1 R |
| 1266734 | 3/1972 | United Kingdom | |
| 1268822 | 3/1972 | United Kingdom | |
| 1296010 | 11/1972 | United Kingdom | |
| 2016195 | 3/1982 | United Kingdom | |

OTHER PUBLICATIONS

Quote–Acrostic Puzzle, *The Washington Post Magazine*, Mar. 31, 1985, p. 37.

*Primary Examiner*—Harland S. Skogquist
*Attorney, Agent, or Firm*—Oblon, Fisher, Spivak, McClelland & Maier

[57] ABSTRACT

A game primarily though not exclusively intended for mass-communication media such as radio, television and newspapers and periodicals, involves the answers to a set of questions being assembled, for example, as numbers, according to a predetermined explicit or problematic algorithm into an instruction such for example as a telephone number by means of which the first solver can identify himself and claim a prize.

5 Claims, No Drawings

COMPETITIVE GAME

This application is a continuation, of application Ser. No. 427,726, filed Sept. 29, 1982, now abandoned.

BACKGROUND TO THE INVENTION

This invention concerns a competitive game, particularly, though not essentially, adapted to be played using a mass-communication medium such as radio or television, whereby the number of players may be unlimited.

Competitive games played on mass-communication media, such as panel games, quiz shows and the like, are limited, in the number of participants who can hope to gain a prize, to a very small number, typically less than ten per program. Accordingly, such games must rely for their "audience appeal" on factors such as the personality of the compere or presenter, the format of the program, the "entertainment" content of the program and to some extent the nature and value of the prizes.

The present invention, while not denying the importance of those factors, provides another, more imperative or compulsive reason for watching the program, in that it, for the first time, actually permits instantaneous mass audience participation with prize-winning prospects.

BRIEF DESCRIPTION OF THE INVENTION

The invention comprises, in one aspect, a method for playing a competitive game comprising
(a) posing a plurality of questions
(b) giving an algorithm for assembling the answers to the questions into a codeword, and
(c) rewarding the first production of the codeword.

The algorithm may be explicit—an example of an explicit algorithm would be "write down the numbers you have generated as answers to the questions in reverse order"—or may itself be the answer to a question—for example, the answers to the first four questions might be

|          |    |
|----------|----|
| Answer 1 | 12 |
| Answer 2 | 27 |
| Answer 3 | 49 |
| Answer 4 | 5  | and the algorithm might be the answer to the question "what is the largest number you can make out of the digits making up the answers to questions 1 thru 4?" The answer would be

9754221

It will be seen that, written as above, such an answer resembles a telephone number (might need to be longer if it is to include an area code).

If the game is played on a broadcast medium like television, the final solving of the questions and arrangement of the answers according to the explicit or implicit algorithm would yield a telephone number which connected the first solver to dial it with the desk of the compere or presenter of the program actually while the program is in progress.

Such a game, popularised perhaps on television, could become a popular game also at home, when somewhat modified techniques would be used. Instead, for instance, of dialling a telephone number, a player might assemble a set of tiles ("tiles", used in its widest sense, including playing and like cards, dominoes, counters, tokens and the like) into a particular pattern which has to match a predetermined pattern, pre-assembled from like tiles, to form a codeword. "Word" in this context, of course, includes in addition to words made up of letters, words also made up of colours, numerals or other symbols or combinations of any two or more of them.

In another aspect, the invention comprises a competitive game comprising means enabling a plurality of questions to be put in turn to a group of competing players, each such question providing a plurality of possible answers thereto, only one of which is correct, each possible answer being labelled with desired indicia, all of which is arranged such that the combination of the indicia in a predetermined manner from a complete set of correct answers can be assembled by a player to create a valid codeword, and means enabling the first player to create the valid codeword to use it to be declared the winner of the game.

There may, of course, be more than one prize. This may be allotted on a time basis—so that, for instance the same telephone number would call three 'phones, one after the other so that the first three solvers would arrive in time relationship. Or partially correct answers could be reworded by generating different numbers which, however, would ring second prize and third prize 'phones.

The invention will be further apparent from the following description which concerns, by way of example only, two kinds of competitive game embodying it.

The first form of the game is adapted to be played in the home by, for example, the members of a family and their friends.

There is provided a plurality of cards, each of which carries a question and a plurality of possible answers, each of which is labelled with some indicia, in this example a coloured square. Each of the possible answers in any one question will be labelled with a different colour, but the same colours may be used in different questions.

There is also provided, for each player sets of tiles, or the like, of different colours corresponding with the colours used to label the answers to the questions.

In use, the cards of the series of question cards are exposed in turn to the players. Each player decides for himself which of the possible answers for each question is correct, notes the colour which codes for it, and as play proceeds assembles a strip of tiles, which he expects (or hopes) will match a checking strip provided for each round of the game and coding for a set of correct solutions.

When the last question in each round has been exposed to the players, the first to present his strip of tiles, after such manipulation as rules may require, will be declared the winner of the round, assuming, of course, that his strip matches the appropriate checking strip, which has been previously concealed.

The second form of the game is suited for an unlimited number of players, and is conducted through the medium of a television programme. On the programme a suitably popular compere introduces the game and asks a series of questions. Each question is visually presented and includes a plurality of possible answers to the question, only one of which is correct. Each of the possible answers is associated with a code number.

As play progresses, each player, and in this example, from the unlimited number who may choose to watch the programme, records the number which he believes to code for the correct answer to each question. After the last question has been asked, which might usefully be of a form requiring some short period of time to elapse to enable the correct solution to be identified (as by way of calculation, for example), the players will be invited to assemble their selected code numbers in a particular manner, for example in inverse order, to produce a telephone number. The first player to make a telephone call, using the telephone number coding for a correct set of answers to all of the questions in the series, will be connected with the compere of the programme and will be declared the winner of that round, and will be entitled to a prize, perhaps of substantial value.

For example, a series of questions might relate to the sport of fishing, and the prize might be a fishing rod or a shark fishing expedition for two in the Carribean. Yet another series might relate to astronomy, and the prize be a telescope, and so on. The possibilities are endless, and the game can be organised so that all interests are represented and no particular section of the community or social class is favoured.

The manner in which the code numbers are selected and assembled will be chosen to ensure that calls placed with telephone numbers coding for an incorrect set of answers will not connect with and therefore be a nuisance to ordinary telephone subscribers. For example, the assembly of the code numbers may include the mandatory addition of a numeric prefix, which will in fact be a dedicated area code.

Competitive televised games of one kind or another are immensely popular. They must be even more so, if the entire audience can participate in an active rather than passive manner.

It will be appreciated that it is not intended to limit the invention to the above examples only, many variations, such as might readily occur to one skilled in the art, being possible, without departing from the scope thereof.

Thus, for example, the rules by which individual elements of indicia are assembled to form a codeword which can be tested for a win might include rejection of some such elements, thus enabling each round to include more than would otherwise be required to generate the winning codeword.

The game may also be played, for example, in the local or national press by way of newspapers or journals. In this case, the use of a telephone answering service or machine will avoid the need to keep a local station permanently on the air.

We claim:

1. A method of conducting a game by using a broadcasting arrangement broadcasting to an audience and a telephone network serving members of said audience and said broadcasting arrangement, comprising the steps of:
   obtaining a pre-determined telephone number serving said broadcasting arrangement;
   broadcasting to said audience a series of questions;
   broadcasting to said audience an algorithm for manipulating the collective answers to said series of questions, which algorithm when correctly followed using correct answers to said series of questions will produce as a result said pre-determined telephone number, and which algorithm when not correctly followed using correct answers to said series of questions will not produce as a result said pre-determined telephone number;
   broadcasting to said audience an instruction to carry out said algorithm, to treat the result produced thereby as a telephone number, and to call said resulting telephone number;
   receiving at least the first call arriving thereafter at said pre-determined telephone number; and
   declaring a call arriving at said pre-determined telephone number to be the first place winning call.

2. A method according to claim 1, further including the steps of:
   obtaining at least one additional predetermined telephone number serving said broadcasting arrangement;
   designing said algorithm such that, when correctly followed but using correct answers to less than all of said series of questions, it can produce as a result said at least one additional predetermined telephone number;
   receiving at least the first call arriving at said at least one additional predetermined telephone number; and
   declaring at least one call arriving at said at least one additional predetermined telephone number to be a winning call of less than first place rank.

3. A method according to claim 1, wherein said broadcasting arrangement comprises a television station.

4. A method according to claim 1, wherein said algorithm employs the answers to more than one but less than all of said series of questions.

5. A method according to claim 1, further including the steps of:
   broadcasting together with each of said series of questions a plurality of possible answers and a code associated with each said possible answer; and
   broadcasting to said audience an instruction to treat said codes as answers to the questions for purposes of carrying out said algorithm.

* * * * *